(12) United States Patent
Collias et al.

(10) Patent No.: US 9,678,410 B2
(45) Date of Patent: Jun. 13, 2017

(54) ELECTRICALLY ADJUSTABLE OPTICAL DIFFUSION FOR LUMINAIRES

(71) Applicants: James H. Collias, Portland, OR (US); Charles H. Collias, Chelmsford, MA (US); Nicholas J. Foster, San Francisco, CA (US); Jeffrey M. Hamel, Townsend, MA (US)

(72) Inventors: James H. Collias, Portland, OR (US); Charles H. Collias, Chelmsford, MA (US); Nicholas J. Foster, San Francisco, CA (US); Jeffrey M. Hamel, Townsend, MA (US)

(73) Assignee: Zylight LLC, Los Angeles, CA (US)

( * ) Notice: Subject to any disclaimer, the term of this patent is extended or adjusted under 35 U.S.C. 154(b) by 0 days.

(21) Appl. No.: 14/792,473

(22) Filed: Jul. 6, 2015

(65) Prior Publication Data

US 2016/0131962 A1    May 12, 2016

Related U.S. Application Data

(63) Continuation of application No. 13/084,562, filed on Apr. 12, 2011, now Pat. No. 9,075,286.

(51) Int. Cl.
| | | |
|---|---|---|
| *G02F 1/1333* | (2006.01) |
| *G02F 1/1335* | (2006.01) |
| *G02F 1/1343* | (2006.01) |
| *G02B 5/02* | (2006.01) |
| *G03B 15/06* | (2006.01) |
| *C09K 19/54* | (2006.01) |
| *G02B 26/02* | (2006.01) |
| *G02F 1/1334* | (2006.01) |
| *G02F 1/13* | (2006.01) |
| *G02F 1/133* | (2006.01) |

(52) U.S. Cl.
CPC ............ *G03B 15/06* (2013.01); *C09K 19/544* (2013.01); *G02B 5/0278* (2013.01); *G02B 26/02* (2013.01); *G02F 1/1313* (2013.01); *G02F 1/1334* (2013.01); *G02F 1/13306* (2013.01); *G02F 1/13439* (2013.01); *G02F 1/133305* (2013.01); *G02F 1/133308* (2013.01); *G02B 2207/113* (2013.01)

(58) Field of Classification Search
None
See application file for complete search history.

(56) References Cited

U.S. PATENT DOCUMENTS 4,323,952 A * 4/1982 Proske ................... G03B 15/05
                                                                   362/17
5,651,602 A * 7/1997 Tawil ........................ F21V 7/05
                                                                   362/17

(Continued)

*Primary Examiner* — Ryan Crockett
(74) *Attorney, Agent, or Firm* — J. Douglas Wells

(57) ABSTRACT

Diffusing light illuminating a light target or subject of a film or video production including placing a diffusion panel between a light source and a light target, energizing said light source so as to direct light therefrom through the diffusion panel, and electrically adjusting the transparency of the diffusion panel by changing an electric potential applied to electrodes of the diffusion panel. The electrically adjustable diffusion panel eliminates the need for manually changing diffusion papers or other filters and provides a continuous range of selectable levels of transparency/diffusion.

8 Claims, 5 Drawing Sheets

(56) References Cited

U.S. PATENT DOCUMENTS

| | | | | |
|---|---|---|---|---|
| 5,764,316 | A * | 6/1998 | Takizawa | F21V 9/10 348/114 |
| 6,614,409 | B1 * | 9/2003 | Bae | A61F 9/065 2/8.7 |
| 8,167,457 | B1 * | 5/2012 | Collias | H05B 33/0863 362/249.03 |
| 8,313,203 | B1 * | 11/2012 | Guiney | G03B 15/02 362/18 |
| 2007/0241002 | A1 * | 10/2007 | Wu | G06F 1/1601 206/150 |
| 2011/0058113 | A1 * | 3/2011 | Threlkel | E06B 9/24 349/1 |
| 2011/0116249 | A1 * | 5/2011 | Jefferson, III | G03B 15/02 362/18 |

* cited by examiner

ELECTRICALLY ADJUSTABLE OPTICAL DIFFUSION FOR LUMINAIRES

CROSS-REFERENCE TO RELATED APPLICATIONS

This is a continuation of U.S. application Ser. No. 13/084,562 filed on Apr. 12, 2011, entitled ELECTRICALLY ADJUSTABLE OPTICAL DIFFUSION FOR LUMINAIRES.

BACKGROUND OF THE INVENTION

This disclosure relates to light diffusion techniques used in the film and video production industry and, more particularly, to diffusion of light sources used in film or video production using materials having electrically adjustable light diffusion characteristics.

Lighting techniques used in the production of film and video have long been carefully and diligently studied by the artists, technologists, and other professionals practicing in the film and video industry. Careful attention is paid to the creation of lighting conditions so as to achieve particular desired effects. Volumes have been written about the characteristics of light most preferred in a given situation, how various environmental or set conditions impact lighting quality, the considerations that should be given depending upon the subject of the film or video, and so on. Volumes more may be written of the particular equipment preferences that those responsible for lighting on a film or video crew use to accommodate various circumstances. In a conventional motion picture production, the gaffer or lead person on the electrical crew, for example, may work closely with the crew best boy, grips, and other electricians to design and build the lighting setup for a particular production, using experience and industry trade practices to determine the appropriate gels and diffusion materials to put on lights or windows to achieve the desired effects, or to determine whether or not to use various materials and equipment to re-create particular natural effects within a better controlled stage or to adapt such materials and equipment to allow for on-location filming. Much of the expertise of such professionals is likely maintained as closely held tricks of the trade and other proprietary information.

What may be generally true is that innovative approaches to film and video production have been widely sought after and favorably received by the film and video industry in the U.S., particularly where such innovations provide improvements in costs so as to lower overall production costs; improvements in the features and functionality available to the users of newly developed equipment; improvements in quality of equipment or reliability of the equipment or the processes of using various equipment; and improvements in the speed with which film and video production may be successfully completed.

Some of the more labor intensive aspects of film and video production involve engineering lighting effects that deliver desired results, accommodate physical space requirements of the set, and provide means for adapting to changes in set conditions such as weather, natural light position, camera angles, and subject position throughout a scene, and other factors requiring, ideally, instant changes in lighting provided for the shoot. The lighting equipment used should be reconfigurable to accommodate a range of different physical space requirements and adaptable to changing set conditions with a minimum of labor.

What is needed, therefore, are light diffusion techniques and equipment for the diffusion of light sources used in film or video production that address various shortcomings of existing techniques and equipment. The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For a more complete understanding of the present invention, the drawings herein illustrate examples of the invention. The drawings, however, do not limit the scope of the invention. Similar references in the drawings indicate similar elements.

DETAILED DESCRIPTION OF PREFERRED EMBODIMENTS

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and systems have not been described in detail.

Various operations will be described as multiple discrete steps performed in turn in a manner that is helpful for understanding the present invention. However, the order of description should not be construed as to imply that these operations are necessarily performed in the order they are presented, nor even order dependent.

Figure 1:
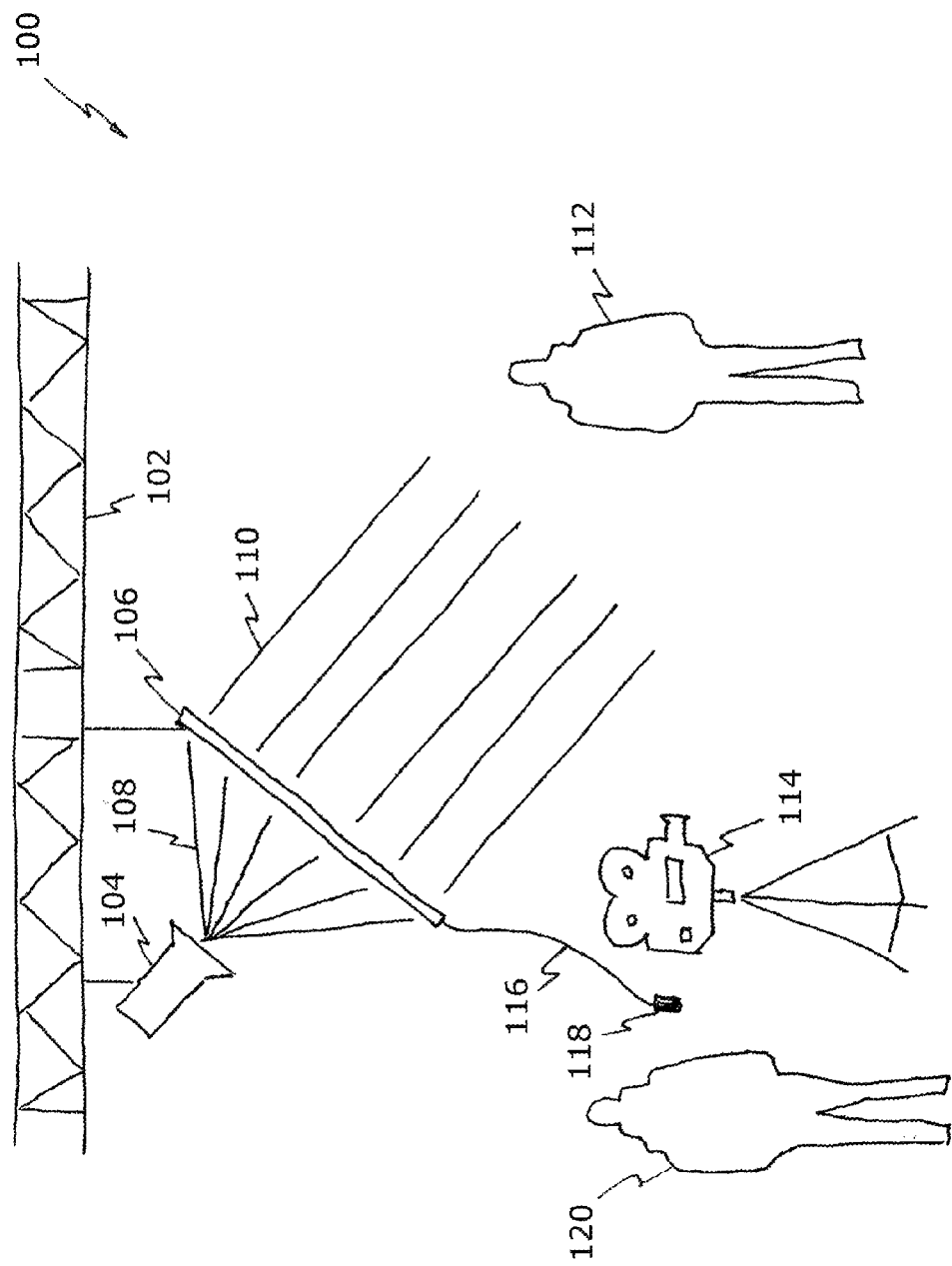
FIG. 1 illustrates a film or video set using a remotely adjustable diffusion panel, according to one embodiment.

As an overview, a film or video set 100 using a remotely adjustable (or remotely controllable active) diffusion panel 106, according to one embodiment, is shown in FIG. 1. When illuminating a subject 112 with a light source 104 for the purpose of photography, videography, motion picture capture, or theater, it is often desirable for the light source 104 to deliver light that is "soft" in nature/character. A light source that delivers such light is often referred to as a "soft source" and is an illumination that appears to emanate from a large area, thereby casting shadows that have gradual transitions from light to dark, or "soft shadows". In contrast, a "hard source" is an illumination that appears to emanate from a point source such as a single bulb or filament, thereby casting "hard shadows" that have a distinct and deliberate transition from light to dark.

Most of the illumination sources used are point source type lights such as filament-based incandescent bulbs. Such lights cast harsh or distinct shadows. Various methods of light diffusion may be used to help soften the light source as its light appears to the subject. One method to soften the light is to place a relatively large piece of semi-transparent material between the hard light source and the subject to diffuse the hard light. The diffusion material is illuminated on one side by the hard light source and appears to glow relatively uniformly on the opposite side which faces the subject. The subject then appears to be illuminated by a soft light source effectively as large as the illuminated surface of the diffusion material.

Choosing among different diffusion materials most commonly involves choosing material that has particular transparency characteristics. A material with high transparency will make a hard source only slightly softer (if at all) while a more opaque material will be the most effective at softening a hard source. Each subject or lighting situation may require a unique level of diffusion to give "just the right look", and no single diffusion material having a particular transparency may provide the "right" amount of diffusion for every situation.

Consequently, throughout a typical filming shoot the diffusion material (and thus the transparency of the material) is often changed multiple times before the desired level of diffusion appropriate to the subject is achieved. The process of selecting the correct diffusion requires having a wide selection of different grades of diffusion materials on hand, and the physical action of removing and replacing the diffusion material near the light source, which often is placed in locations (i.e. overhead structure 102) requiring a ladder or other type of scaffold or lift for sufficient access for placement of the diffusion material.

As shown in FIG. 1, a active diffusion panel 106 having diffusion material that has an electrically adjustable level of transparency may be used to soften the otherwise hard light 108 from a point source light 104. The light transmitted 110 to the subject 112 can be selectably changed in terms of its softness using a remote control 118 to vary the degree of transparency of the (active) material used in the diffusion panel 106. The remote control 118 is preferably connected to the panel 106 by wires 116, but in other embodiments the control 118 may wirelessly communicate with the (active) panel 106. Using an active panel 106 that is adapted to provide a range of transparency from clear (or transparent) to substantially opaque eliminates the need for the user 120 or other lighting crew members to physically change the diffusion material to achieve different levels of diffusion and lighting at the subject. The active material in the panel 106 may be adjusted by the user (camera operator or other crew member) 120 at will during the film shoot to compensate for changing levels of natural light, changes in desired overall illumination, or simply to satisfy the visual goals of the photographer.

Figure 2A:
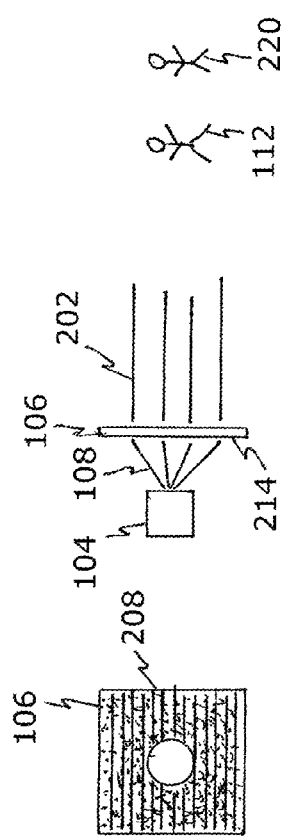
FIG. 2A illustrates no/low diffusion through an adjustable diffusion panel, according to one embodiment.
Figure 2B:
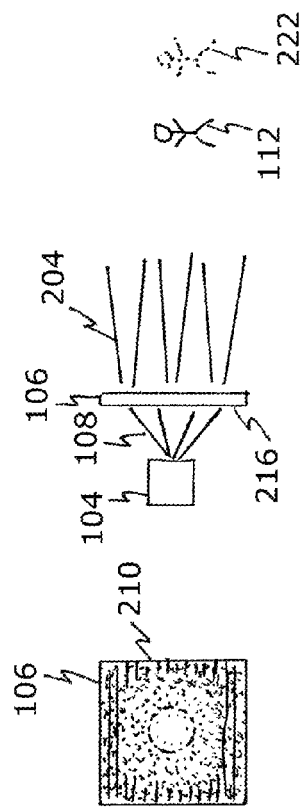
FIG. 2B illustrates medium diffusion through an adjustable diffusion panel, according to one embodiment.
Figure 2C:
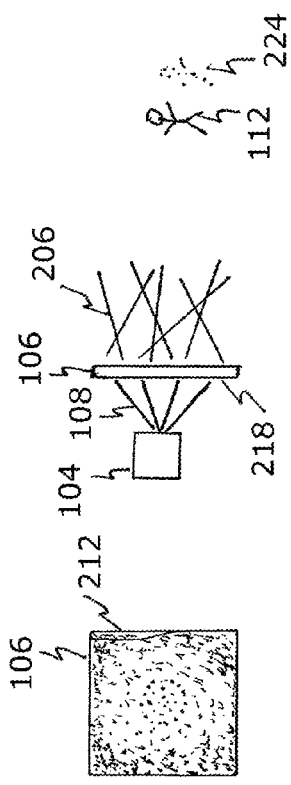
FIG. 2C illustrates high/full diffusion through an adjustable diffusion panel, according to one embodiment.

FIGS. 2A-2C illustrate different levels of diffusion that are preferably provided using an electrically adjustable diffusion panel 106. Conventional diffusion paper ranges from ¼ stop diffusion paper to full or 1 and ¼ stop paper. Light diffusion or ¾ stop paper is more transparent and only slightly softens the shadows/shadow edges. Medium diffusion or ¾ stop paper softens the shadow edges more, causing shadow edges to fade. And heavy diffusion, such as "Lee Filters #216" (brand named) full stop paper causes shadow edges to fade and blend in so the shadows are nearly completely eliminated.

FIG. 2A illustrates the active panel 106 in a fully transparent mode 214. In such a mode 214 the panel 106 allows the light 108 projected from light source 104 to appear to the subject 112 without any scattering. The shadows 220 from such setting of the adjustable panel 106 have sharp edges, and the light transmitted 202 is unsoftened. Viewed from the subject 112, the light source 104 behind the panel 106 may be represented as shown in view 208, indicating that the light source 104 remains an unsoftened point source of light. In the view 208, the panel material is fully transparent, without color. As the diffusion setting 214 is adjusted to provide some diffusion, the view 208 starts to take on, in preferred embodiments, a whitish or cloudy appearance.

FIG. 2B illustrates a medium diffusion setting 216, where the transmitted light 204 is diffused (or scattered) to a medium setting 216 whereby the incident light 108 is scattered somewhat as it passes through the panel 106. With such setting 216, the shadow 222 is softened so as to lose its distinct edges, and viewing the panel 106 from the view point of the subject 112 may be represented as shown in view 210, indicating that the light source behind the panel 106 has become softened and made less distinct. With the medium setting 216 the panel 106 material in view 210 takes on a whitish appearance, and the detail of the light source 104 is lost due to the scattering of light allowed through the diffusion material.

FIG. 2C illustrates a heavy diffusion setting 218, where the transmitted light 206 is now diffused (or scattered) to a heavy setting 218 whereby the incident light 108 is heavily scattered as it passes through the panel 106. With such setting 218, the shadow 224 is softened so as to be nearly eliminated, and viewing the panel 106 from the view point of the subject 112 may be represented as shown in view 212, indicating that the light source behind the panel 106 has become nearly undefined. With the heavy setting 218 the panel 106 material in view 212 takes on a more uniformly whitish appearance, and even the outline of the light source 104 is lost due to the scattering of light allowed through the diffusion material. Adjusting the diffusion of panel 106 to an even heavier (i.e. more diffused) setting preferably causes the panel 106 to become opaque, presenting a view to the subject 112 of a solidly (uniformly) whitish panel. At such a setting, the opaque panel fully blocks the subject 112 from view of the light source 104.

In preferred embodiments, the diffusion provided by panel 106 may be adjusted using a remote control 118 from completely transparent (no diffusion/scattering of the incident light from the light source 104) to fully opaque (complete scattering of the incident light from the light source 104), with the adjustment of diffusion being continuous so that the user 120 may select from any amount of transparency using the control 118, from full transparency to no transparency and any selection of transparency therebetween. In other embodiments, the diffusion provided may be adjusted between nearly transparent to nearly opaque, with any selection of transparency therebetween. In still other embodiments, the diffusion may be adjusted so as to correspond with diffusion papers or filters or scrims available in the film and video industry. For example, the diffusion setting 214 may correspond with ¼ stop diffusion papers commonly available, setting 216 may correspond with ¾ stop papers available, and setting 218 may correspond with full stop papers available. In one embodiment, the control 118 may include detents at various commonly used settings or settable/resettable/programmable presets for the convenience of the user 120 to return to desired diffusion settings.

Although any type of light source may be used, the light source 104 is preferably a cool light source such as LED or fluorescent lighting. Commonly used incandescent or other hot type lighting may be used with sufficient shielding incorporated into panel 106, with sufficient spacing between the light source 104 and the panel 106, and/or with use sufficient cooling means (such as fans, heat sinks, favorable ambient/cooling temperatures, etc.). Preferably, LED lighting such as lighting provided by Zylight LLC (www.zylight.com) is used for the light source 104. Suitable lighting is also described in the application for U.S. letters patent, application Ser. No. 11/423,443 filed on Jun. 11, 2006, which is hereby incorporated by reference herein in its entirety, and which describes wirelessly controllable and wirelessly networked LED lighting modules.

Figure 3:
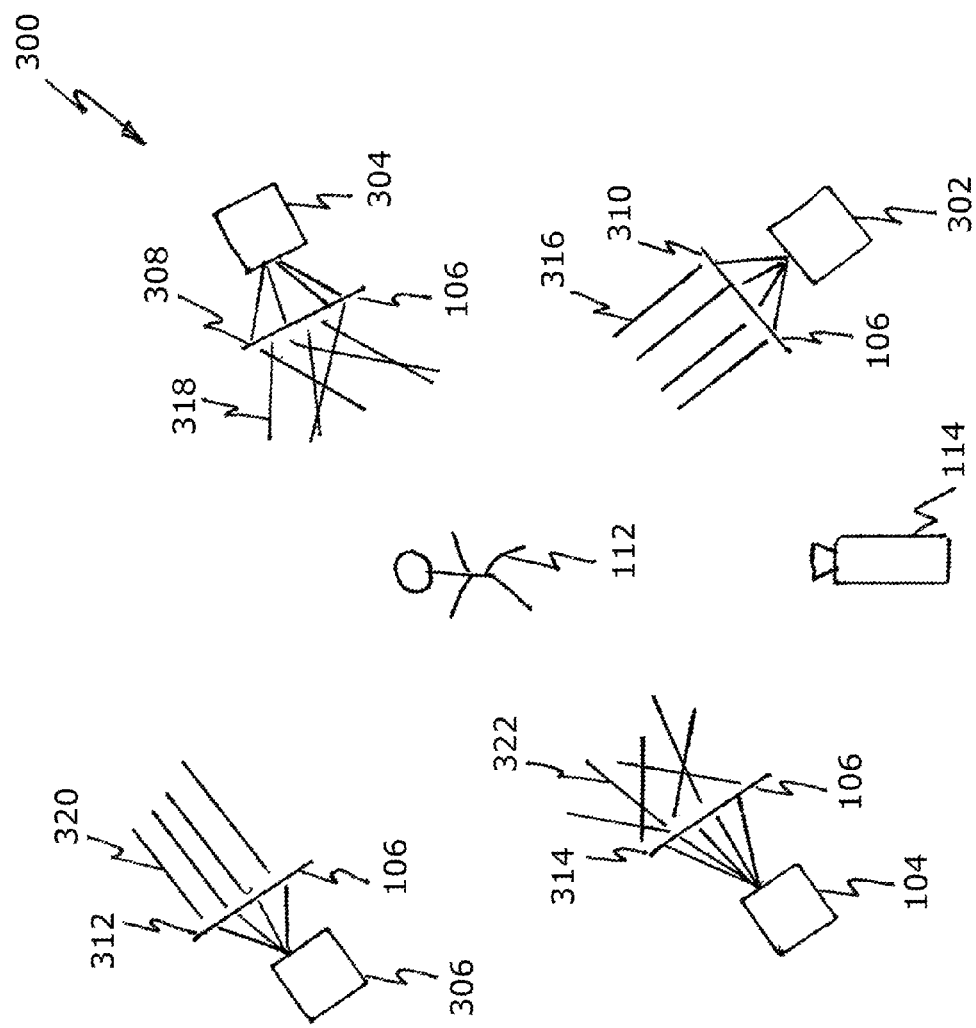
FIG. 3 illustrates lighting with multiple adjustable diffusion panels, according to various embodiments.

Referring to FIG. 3, multiple remotely controllable diffusion panels 104 may be used together. For example, a typical film or video production set may include the lighting set up 300 shown in FIG. 3, including a key (or primary) light source 104, a fill light 302, a back light 304, and a background light 306. In preferred embodiments, each of the active diffusion panels 106 may be remotely electrically controlled so as to provide desired levels of diffusion. The panels 314 and 308 may be set, for example, to medium-to-heavy diffusion settings for transmitting diffused light 322 and 318, respectively. The panels 310 and 312, similarly, may be set, for example, to lower diffusion/greater transparency settings for transmitting diffused light 320 and 316, respectively.

Figure 4:
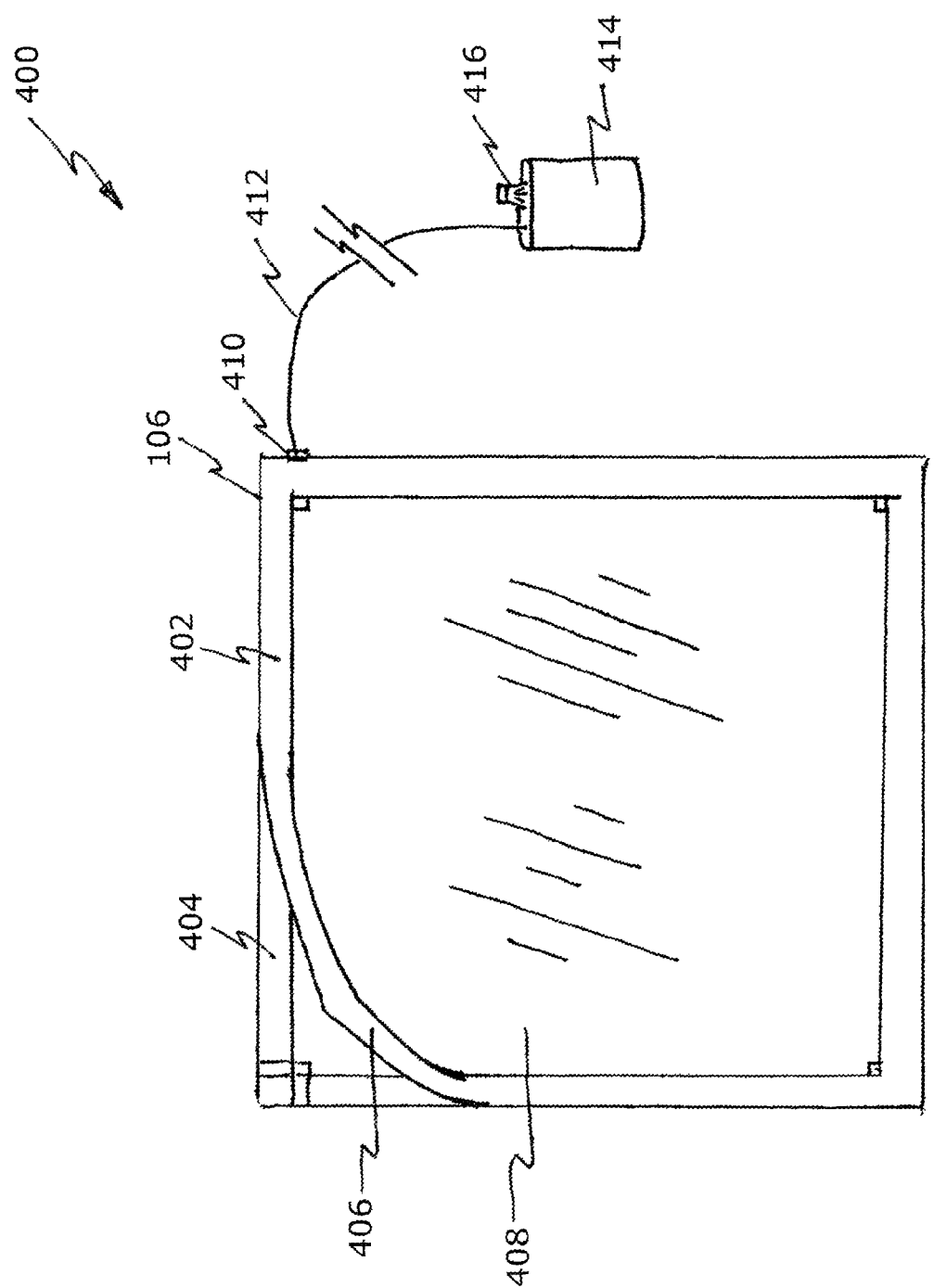
FIG. 4 illustrates components of an exemplary adjustable diffusion panel.

Referring to FIG. 4, the components 400 of an exemplary adjustable diffusion panel 106 preferably include active material 408 that provides a range of electrically selectable degrees of transparency, frame fastening material 402 for affixing the active material 408 to a rigid or semi-rigid frame 404, and a controller 414 having circuitry adapted to control an electrical potential applied to the material 408 causing the material to change its transparency in response to the electrical potential selected by the user of the controller 414 and thereby applied to the active material 408. In one embodiment the controller includes a 9 volt battery, a potentiometer or other potential changing selection knob 416, wires 412 for delivering an electrical potential (i.e. voltage) to the material 408 via a connection 410. Preferably the material 408 and frame fastening material 402 (which may be a magnetic backed material, Velcro type material, or other material preferably easily removable from rigid or semi-rigid frame 404) are rollable 406 so as to facilitate easy mobility from shoot to shoot. Other structures may be used in place of the frame 404, and other shapes of the frame 404 may be used.

Preferable sizes include a 2 foot by 2 foot diffusion panel 106, a 3 foot by 3 foot version, and a 4 foot by 4 foot version. Other sizes may be fabricated. Generally, any size and any shape (square, rectangular, irregular, circular, etc.) may be used. Preferably the surface area of the material 408 is large relative to the light source 104 for most applications. An electrically adjustable active diffusion panel 106 may also be used, however, with panel lights (such as the IS3 by Zylight LLC) in soft box or other applications.

The active material 408 may comprise any material whose transparency may be electrically adjusted from transparent (or nearly transparent) to opaque (or nearly opaque). In preferred embodiments, the material 408 comprises a polymer dispersed liquid crystal (PDLC) film between layers of flexible, transparent plastic that include a thin layer of conductive, transparent material. The conductive material form transparent electrodes with liquid crystal droplets trapped therebetween, and the liquid crystal droplets align together in varying degrees in response to a voltage applied across the electrodes. With greater voltage, more of the liquid crystals align thus increasing the material's effective transparency.

Figure 5B:
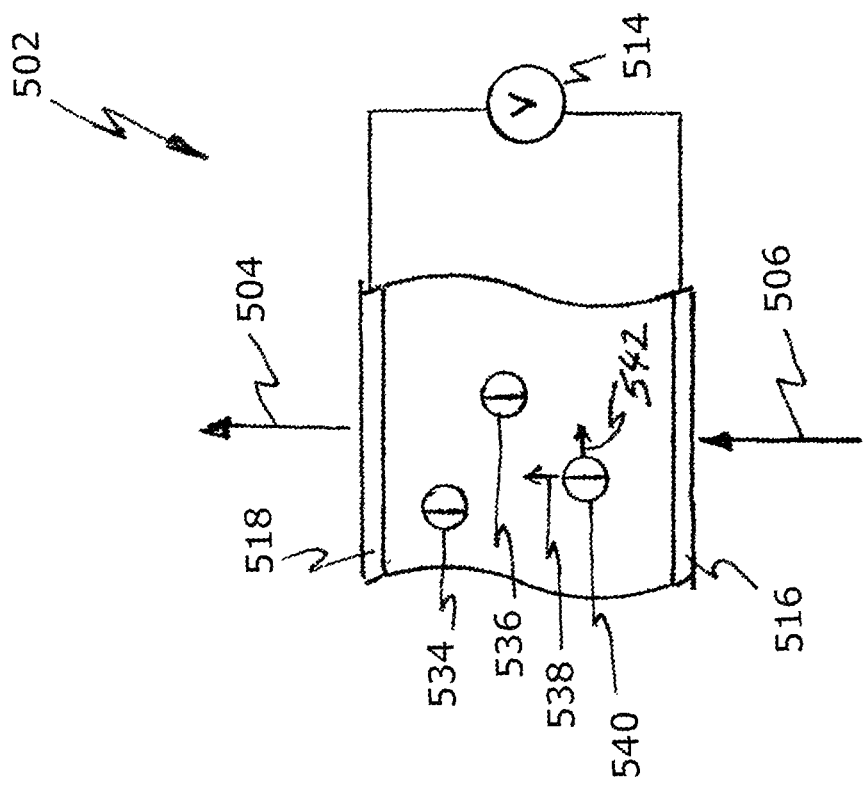
FIG. 5B illustrates exemplary material for an adjustable diffusion panel in another state of transmittance, according to one embodiment.
Figure 5A:
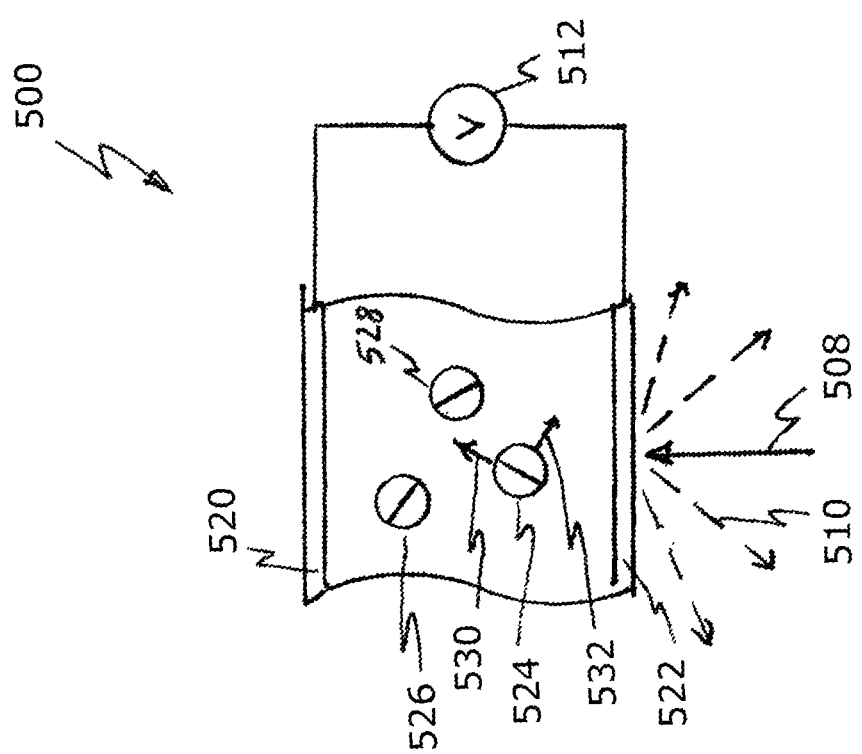
FIG. 5A illustrates exemplary material for an adjustable diffusion panel in one state of transmittance, according to one embodiment.

FIG. 5A illustrates a cross-section 500 of material 408, according to one embodiment, where the material 408 is in an "off" state, and FIG. 5B illustrates a cross-section 502 of material 408 where the material 408 is in an "on" state.

As shown in FIG. 5A, with no applied voltage 512, transparent electrodes 520 and 522 do not cause any alignment of the liquid crystal droplets 526, 528, and 524. Therefore, because each of the liquid crystals transmits light in one direction 530 and blocks light in a perpendicular direction 532, the cross-section 500 causes incident light 508 to scatter 510 rather than allow transmittance of the light 508 through the PDLC matrix.

As shown in FIG. 5B, the cross-section 502 allows incident light 506 to pass through the PDLC matrix as transmitted light 504 due to the alignment of the liquid crystals 534, 536, and 540 in response to a voltage 514 applied to the transparent electrodes 518 and 516. The degree of transparency depends upon the voltage applied and degree to which the liquid crystal droplets align together. As shown, the liquid crystals 534, 536, and 540 are all aligned so as to allow incident light to pass through. As the voltage is varied, the alignments are changed causing the material to scatter incident light and take on a milky white or cloudy appearance. For example, reducing the voltage applied to electrodes 518 and 516 preferably causes the liquid crystal 540 to spin out of alignment such that the direction 538 is no longer aligned with the incident light 506 and the direction 542 begins to block the incident light 506.

Although the material 408 in preferred embodiments is constructed as shown and operates as described in FIGS. 5A and 5B, other arrangements, materials, and configurations may be used that provide the desired electrically adjustable transparency adapted for a diffusion panel 106 as shown and described herein.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method of diffusing light illuminating a subject of a film or video production comprising the steps of:
   (a) placing a diffusion panel between a light source and a light target, said diffusion panel comprising an electrically adjustable optical diffusion panel adapted for luminaires used in a film or video production, the diffusion panel comprising (i) a frame having a horizontal length and a vertical height defining a plane and enclosing a perimeter of an active diffusion two-dimensional planar area through which incident light from a film or video production light source passes, transversing the planar active diffusion area enclosed by the perimeter frame to become transmitted light thereafter, (ii) diffusion material affixed to frame fastening material substantially aligned with said perimeter of said frame, and said diffusion material covering said active diffusion area, said diffusion material having its transparency continuously and variably changeable between a substantially transparent state and a substantially opaque state in response to an electric potential applied to electrodes of said diffusion material, said electrodes comprising inseparable layers of conductive, transparent material covering and co-planar with said active diffusion area and having liquid crystal trapped therebetween, wherein said diffusion material with said frame fastening material is, without being affixed to said frame, flexible enough to allow said diffusion and frame fastening material to be rolled and thereafter unrolled without degradation to the transparency range of said diffusion material, and (iii) a controller electrically interconnected with said electrodes, said controller having circuitry adapted to provide said electric potential to said electrodes;

(b) energizing said light source so as to direct light therefrom through said diffusion panel; and (c) electrically adjusting the transparency of said diffusion panel by changing said electric potential using said controller.

2. The method of claim 1 wherein electrically adjusting the transparency of said diffusion panel comprising rotating a knob to change said electric potential.

3. The method of claim 1 wherein said substantially transparent state provides a substantially clear panel through which said light source is visible to a subject of said film or video production and shadows cast by said light source have sharp definition.

4. The method of claim 1 wherein said substantially opaque state provides a substantially opaque panel through which said light source is not visible to a subject of said film or video production and shadows cast by said light source have indistinct definition.

5. A method of diffusing light illuminating a subject of a film or video production comprising the steps of:

(a) placing a diffusion panel between a light source and a light target, said diffusion panel comprising an electrically adjustable optical diffusion panel adapted for luminaires used in a film or video production, the diffusion panel comprising (i) a frame having a horizontal length and a vertical height defining a plane and enclosing a perimeter of an active diffusion two-dimensional planar area through which incident light from a film or video production light source passes, transversing the planar active diffusion area enclosed by the perimeter frame to become transmitted light thereafter, (ii) diffusion material affixed to frame fastening material substantially aligned with said perimeter of said frame, and said diffusion material covering said active diffusion area, said diffusion material having its transparency continuously and variably changeable between a substantially transparent state and a substantially opaque state in response to an electric potential applied to electrodes of said diffusion material, said electrodes comprising inseparable layers of conductive, transparent material covering and co-planar with said active diffusion area and having liquid crystal trapped therebetween, wherein said diffusion material with said frame fastening material is, without being affixed to said frame, flexible enough to allow said diffusion and frame fastening material to be rolled and thereafter unrolled without degradation to the transparency range of said diffusion material, and (iii) a controller electrically interconnected with said electrodes, said controller having circuitry adapted to provide said electric potential to said electrodes;

(b) energizing said light source so as to direct light therefrom through said diffusion panel; and (c) electrically adjusting the transparency of said diffusion panel by changing said electric potential using circuitry adapted to wirelessly receive signals and change said electric potential applied to said electrodes in response thereto.

6. The method of claim 5 wherein electrically adjusting the transparency of said diffusion panel comprising rotating a knob to change said electric potential.

7. The method of claim 5 wherein said substantially transparent state provides a substantially clear panel through which said light source is visible to a subject of said film or video production and shadows cast by said light source have sharp definition.

8. The method of claim 5 wherein said substantially opaque state provides a substantially opaque panel through which said light source is not visible to a subject of said film or video production and shadows cast by said light source have indistinct definition.

* * * * *